Patented Mar. 3, 1931

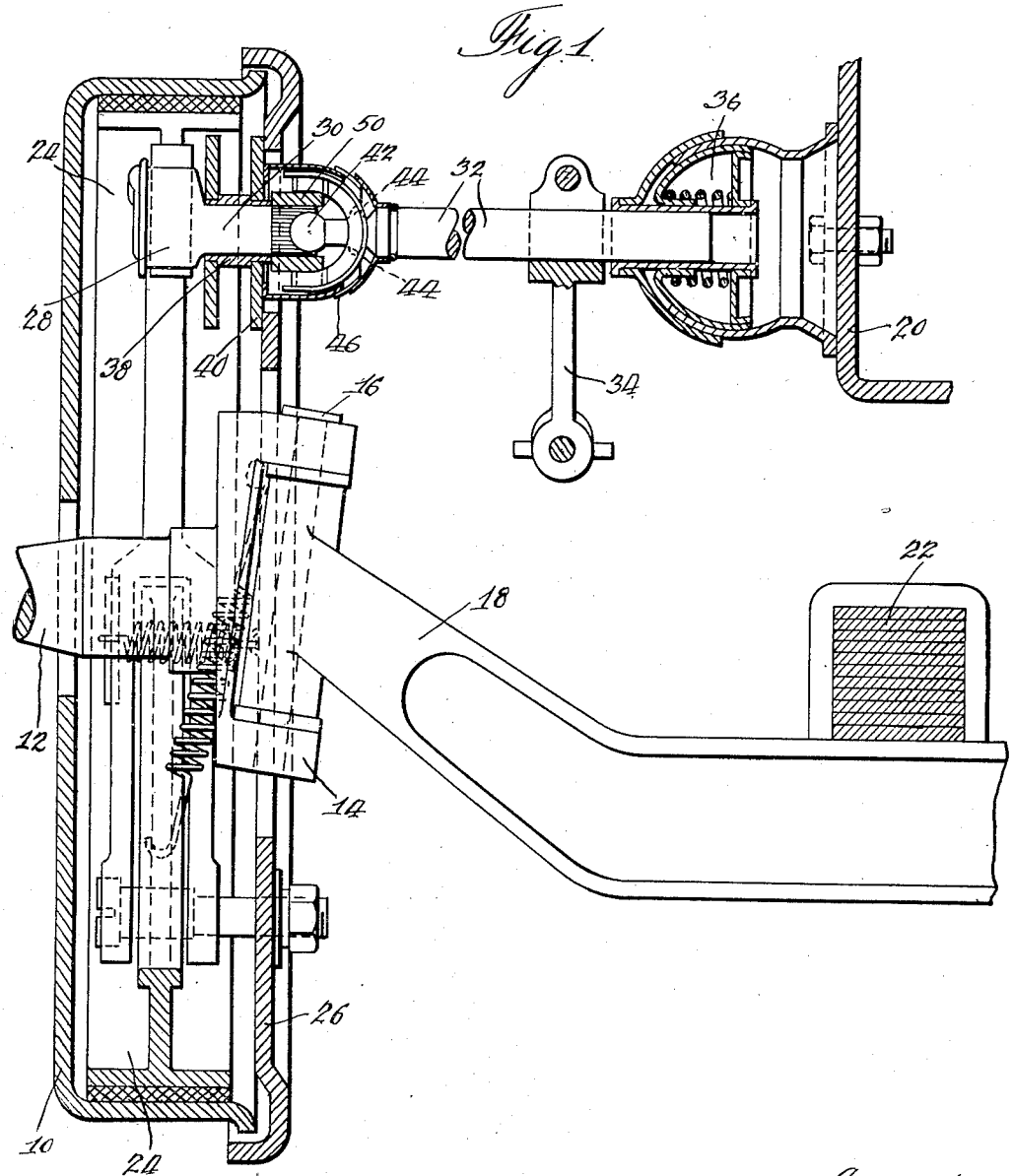

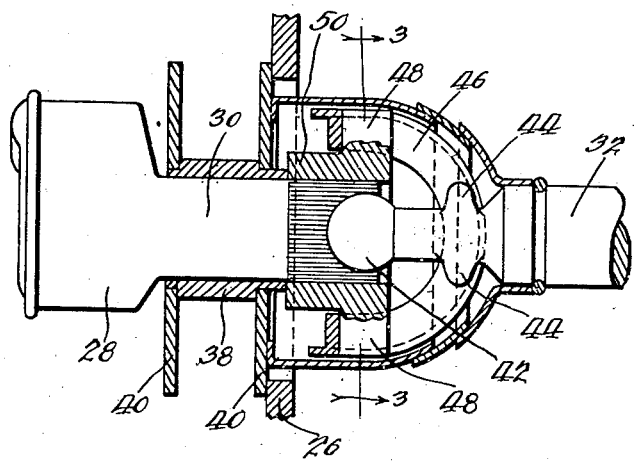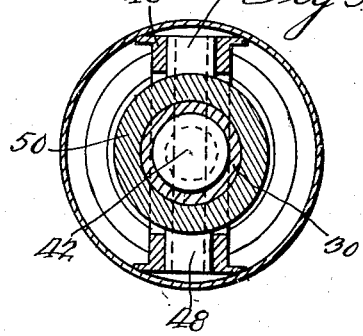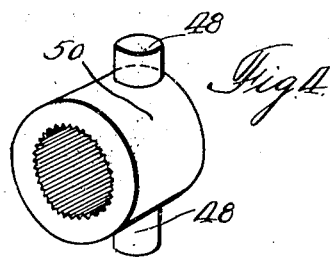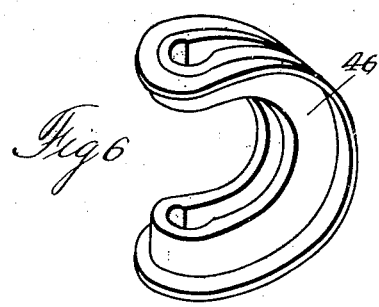

1,794,913

UNITED STATES PATENT OFFICE

KENNETH E. LYMAN, OF CHICAGO, ILLINOIS, ASSIGNOR TO BENDIX BRAKE COMPANY, OF CHICAGO, ILLINOIS, A CORPORATION OF ILLINOIS

BRAKE-APPLYING MEANS

Application filed June 7, 1927. Serial No. 197,179.

This invention relates to brakes, and is illustrated as embodied in novel operating mechanism for a front wheel automobile brake. An object of the invention is to provide a simple joint connecting two brake-applying shafts arranged end to end with the joint substantially at the swivelling axis of the wheel, and most of which joint is arranged on the opposite side of that axis from the wheel. Such a joint is especially advantageous in this location, since there is very little room available between the swivelling axis and the center of the brake, and such of this room as is taken for the universal joint cuts down by that much the length of the bearing which can be provided for the camshaft.

Having this in mind, I provide the operating shaft with a flattened portion, or with a pair of fingers, slidably received in a yoke swivelled on vertical pins on a part carried by the camshaft. Preferably the two shafts are directly connected by a ball-and-socket joint, so that the yoke connection only has to transmit the brake-applying torque.

The above and other objects and features of the invention will be apparent from the following description of the illustrative embodiment shown in the accompanying drawings, in which:

Figure 1 is a vertical section through the right front brake and associated parts, showing the shafts in front elevation;

Figure 2 is a view of part of Figure 1 on a larger scale, showing the joint between the two shafts;

Figure 3 is a section through the joint, on the line 3—3 of Figure 2;

Figure 4 is a perspective view of the part on the camshaft which has the vertical pins;

Figure 5 is a perspective view of the outer end of the operating shaft; and

Figure 6 is a perspective view of the yoke.

The brake illustrated in Figure 1 includes a drum 10, rotating with a wheel (not shown) mounted on the spindle 12 of a knuckle 14 which is swivelled, by a king-pin 16 or the like, to the axle 18. Axle 18 supports the chassis frame 20 through the usual springs 22. The friction means of the brake is illustrated as comprising shoes 24, mounted in any desired manner on a backing plate 26 secured to the knuckle 14, and operated by means such as a cam 28 which may be integral with a shaft 30 actuated by an operating shaft 32 through the medium of a novel universal joint above the king-pin 16 and intersected by the swivelling axis of the wheel, i.e. by the king-pin axis.

Shaft 32 is operated by a lever 34 and at its inner end is slidably and universally supported by a supporting device 36 carried by the frame 20.

The novel joint connecting the shafts is arranged mostly on the side of the swivelling axis opposite the wheel, so that the camshaft bearing 38 may be as long as possible. This bearing is in the form of a bushing carried by two plates 40 mounted in any desired manner on backing plate 26.

Preferably the two shafts 30 and 32 are connected by a ball-and-socket joint, shaft 32 being shown with an integral ball 42 in a socket formed in the end of shaft 32. This joint supports the end of shaft 32, but does not transmit any of the brake-applying torque.

Shaft 32 is also provided with upwardly and downwardly projecting fingers 44, forming a flattened part slidably received in a novel yoke 46. Yoke 46 is swivelled on vertical pins 48 on a part 50 pressed on the splined end of the shaft 30. The axis of pins 48 intersects the center of ball 42, substantially in the swivelling axis of the wheel. Yoke 46 transmits brake-applying torque from fingers 44 through pins 48 to shaft 30.

While one illustrative embodiment has been described in detail, it is not my intention to limit the scope of the invention to that particular embodiment, or otherwise than by the terms of the appended claims.

I claim:

1. Brake-operating mechanism comprising a pair of shafts arranged end to end, a part on the end of one shaft having vertically-projecting pins, and a yoke swivelled on said pins, the other shaft having a flattened part slidably received in said yoke and a ball seated in the end of the other shaft.

2. Brake-operating mechanism comprising a pair of shafts arranged end to end and having a ball-and-socket connection, a part on the end of one shaft having vertically-projecting pins with their axis intersecting the center of said connection, and a yoke swivelled on said pins, the other shaft having a flattened part slidably received in said yoke.

3. Brake operating mechanism comprising a pair of shafts arranged end to end, a ball on the end of one shaft, a seat for said ball in the end of the other shaft, outwardly radially projecting pins on the second mentioned shaft, a yoke swiveled on said pins straddling the end of the said second mentioned shaft said yoke nonrotatably and slidably receiving a portion of the first mentioned shaft.

4. Brake mechanism comprising a pair of shafts arranged end to end, one shaft provided with a ball at one end and a flat radially projecting portion positioned near the ball, said other shaft provided with a seat to receive said ball, and a yoke swiveled on said last mentioned shaft embracing the flat radially projecting portion of the first mentioned shaft to rotate therewith.

5. Brake operating mechanism for a swiveled wheel brake structure comprising, in combination, a pair of brake operating shafts arranged end to end, a ball and socket connection between said shafts arranged substantially in the swiveling axis of the wheel and holding said shafts in working alignment, additional means coupling said shafts together for rotation comprising a yoke swiveled upon one shaft substantially in the vertical line of the ball of said connection, said yoke slidably engaging the other shaft to rotate therewith but transversely slidable thereover.

In testimony whereof I have hereunto signed my name.

KENNETH E. LYMAN.